May 12, 1959 S. L. BROADHEAD, JR., ET AL 2,886,787

PIEZOELECTRIC DEVICE

Filed July 30, 1953 2 Sheets-Sheet 1

INVENTORS.
Samuel L. Broadhead Jr.
William H. Ashley, Jr.
BY
ATTORNEY.

May 12, 1959 S. L. BROADHEAD, JR., ET AL 2,886,787

PIEZOELECTRIC DEVICE

Filed July 30, 1953 2 Sheets-Sheet 2

INVENTORS.
Samuel L. Broadhead, Jr.
William H. Ashley, Jr.
BY [signature]
ATTORNEY.

United States Patent Office 2,886,787

Patented May 12, 1959

2,886,787

PIEZOELECTRIC DEVICE

Samuel L. Broadhead, Jr., Cedar Rapids, Iowa, and William H. Ashley, Jr., Kansas City, Mo., assignors, by mesne assignments, to Donald E. Johnson, Prairie Village, Kans.

Application July 30, 1953, Serial No. 371,256

9 Claims. (Cl. 333—72)

This invention relates to the field of piezoelectricity and, more particularly, to an improved type of piezoelectric device utilizing a single piezoelectric crystal element in combination with novel electrode and coupling means adapting the element for operation under conditions and for purposes with respect to which single-element piezoelectric devices have not heretofore been practical.

Still more specifically, this invention contemplates the provision of a single-element piezoelectric device adapted, when electrically excited by signals of appropriate frequencies, to oscillate mechanically in either, or simultaneously in more than one, of a plurality of different modes of vibration and at either, or simultaneously at more than one, of a plurality of different frequencies, presenting a piezoelectric device having pass band and resonance characteristics of increased breadth and skirt selectivity over those heretofore jointly attainable with single-element piezoelectric devices.

The relatively high Q and the resultant extremely narrow and steep-skirted resonance and pass band characteristics of piezoelectric crystal elements, as well as the consequent advantages thereof in narrow response-band applications over tuned inductance-capacitance circuits, are common knowledge in the art and require no elaboration, as is also the case with many specific applications of those properties, such as in crystal controlled oscillators (as shown by U.S. Patent No. 1,472,583 issued to W. G. Cady on October 30, 1923), in narrow pass band filters or coupling circuits (as suggested by U.S. Patent No. 1,450,246 issued to W. G. Cady on April 3, 1923 and shown in various forms by U.S. Patents No. 1,732,710 issued to M. C. Batsel on October 22, 1929, No. 1,923,354 issued to P. R. Coursey on August 22, 1933, and No. 2,240,293 issued to D. R. Goddard on April 29, 1941), and in a great number of other electrical circuits.

Similarly, the use of a plurality of piezoelectric crystal elements in various forms of lattice type networks to obtain broader pass band characteristics from the network as a whole than had heretofore been believed attainable from a single piezoelectric crystal element while retaining the advantage over inductive-capacitive networks of the steep-skirted response-band shape characteristics attainable with piezoelectric crystal elements (as shown by U.S. Patents No. 1,969,571 issued to W. P. Mason on August 7, 1934 and No. 2,147,712 issued to W. P. Mason on February 21, 1939) is well understood in the art, as is the use of one or more crystal elements as impedances in combination with other types of impedances in relatively complex networks designed for broad or other special pass band characteristics when considering the network as a whole (as shown in U.S. Patents No. 2,198,684 issued to R. A. Sykes on April 30, 1940 and No. 2,308,397 issued to A. T. Starr on June 12, 1943). However, all of such networks have been subject to various limitations and disadvantages including the inherent criticalness of the parameters of such circuits, the exactness of adjustment required with such circuits, the appreciable electrical losses resulting from such circuits particularly when the same are extended to have characteristics approaching those of an ideal rectangular pass band, and the high cost of the components required to form such circuits.

Accordingly, it is the principal object of this invention to provide a piezoelectric device which overcomes the above-mentioned and other limitations and disadvantages of previous broad resonance and pass band circuits and devices, said improved device being adapted for use in wide band applications at high frequencies with lower electrical loss and improved response-band shape, as well as being compacted and economized, as compared with prior apparatus usable in comparable applications.

A further important object of this invention is to provide a piezo-electric device having broad, substantially flat, steep-skirted, pass band characteristics adapting the same for use as an improved means for electrically coupling a pair of electric circuits.

Another important object of this invention is to provide a piezoelectric device having a response band whose width is determinable by the relationship between certain dimensions of the piezoelectric crystal element utilized therein and/or by the disposition of the electrode structure associated with the element relative to the electrical axis of the latter.

Still another important object of this invention is to provide a piezoelectric device utilizing a piezoelectric crystal element adapted by the electrode structure associated therewith for simultaneous mechanical oscillation in two different modes of vibration and at two different corresponding, dominant frequencies, said element being damped or otherwise adjusted by suitable means to render the same substantially equally responsive to exciting signals coupled therewith of frequencies anywhere within a preselected band of frequencies including said pair of dominant frequencies.

The foregoing and other more specific objects of this invention will be made clear or become apparent as the following specification progresses.

It is known that certain, indeed most, types or "cuts" of piezoelectric crystal elements, when appropriately excited, are capable of oscillating mechanically in any of a number of different modes of vibration. The high frequency shear modes of vibration of an "AT cut," quartz crystal have been found particularly significant and useful in practicing this invention, it being recognized, however, that "BT cut," quartz crystals exhibit similarly useful vibrational capabilities at higher frequencies, and that the broad principles of this invention may also be found useful under particular conditions with still other types or cuts of crystal elements.

Figure 1:
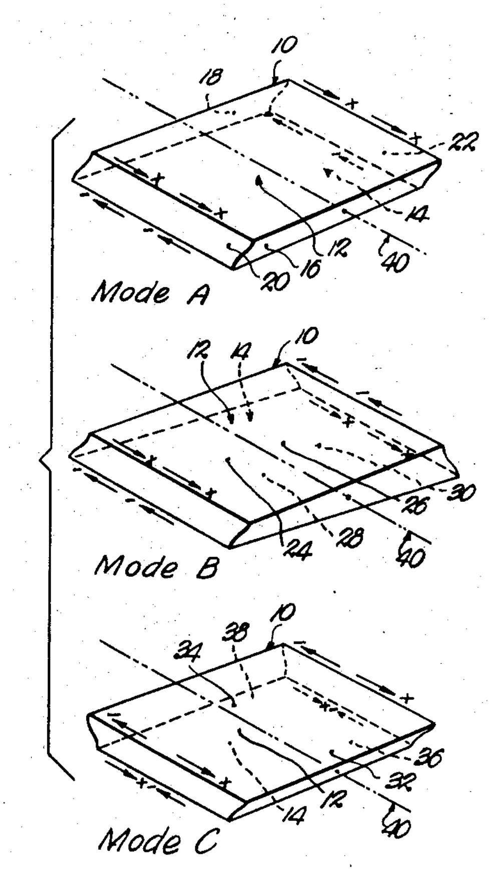
Figure 1 illustrates perspectively, and in exaggerated manner, the instantaneous distortion of and charge pattern on a given, piezoelectric crystal element during its oscillation in three of the possible modes of mechanical vibration of which it is capable.

In Fig. 1 an AT cut, quartz crystal element 10 is illustrated during mechanical oscillation in each of the three principal high frequency modes of shear vibration of which it is capable, the modes being respectively designated as "Mode A," "Mode B" and "Mode C." According to one accepted method of more precisely defining such modes, Mode A is the $m=1$, $n=1$, and $p=1$ length-thickness, shear mode, Mode B is the $m=1$, $n=1$ and $p=2$ length-thickness, shear mode, and Mode C is the $m=1$, $n=2$ and $p=1$ length-thickness, shear mode, reference being made to "Quartz Crystals for Electrical Circuits" by Raymond A. Heising, section 6.23, pages 209–212, D. Van Nostrand Company, Inc., 1946, for further elaboration regarding such designations.

It will be understood that element 10 is normally provided with a pair of opposed, parallel faces 12 and 14 defined by the length and breadth of element 10, said faces being for convenience hereinafter respectively referred to as the "upper" face 12 and the "lower" face 14, a pair of opposed, parallel edges 16 and 18 preferably perpendicular to faces 12 and 14 and defined by the length and thickness of element 10 when the latter is in non-vibrating condition, said edges being for convenience hereinafter respectively, referred to as the "front" edge 16 and the "rear" edge 18, and a pair of opposed parallel ends 20 and 22 preferably perpendicular to faces 12 and 14 and edges 16 and defined by the breadth and thickness of element 10 when the latter is static, said ends being for convenience hereinafter respectively referred to as the "left" end 20 and the "right" end 22, it being contemplated that the thickness of element 10 will preferably be substantially less than its length or breadth but that the "length" referred to herein may be either greater than, equal to or less than the "breadth" referred to herein. Further, that half of upper face 12 adjacent left end 20 is labeled the upper-left face portion 24, the half of upper face 12 adjacent right end 22 is the upper-right face portion 26, the half of lower face 14 adjacent left end 20 is the lower-left face portion 28, the half of lower face 14 adjacent right end 22 is the lower-right face portion 30, the half of upper face 12 adjacent front edge 16 is the upper-front face portion 32, the half of upper face 12 adjacent rear edge 18 is the upper-rear face portion 34, the half of lower face 14 adjacent front edge 16 is the lower-front face portion 36, and the half of lower face 14 adjacent rear edge 16 is the lower-rear face portion 38.

The electrical axis 40 of element 10 may be considered as extending therethrough midway between and parallel to ends 20 and 22, and perpendicular to edges 16 and 18, when element 10 is in non-vibrating condition. An arbitrary axis 42, which is perpendicular to electrical axis 40, and which may be parallel to or rotated from the mechanical axis of element 10 by an angle dependent upon the cut of element 10, extends through element 10 midway between and parallel to edges 16 and 18, midway between and parallel to ends 20 and 22, and perpendicular to faces 12 and 14, when element 10 is static. Still another arbitrary axis 44, which is perpendicular to the axes 40 and 42, extends through element 10 midway between and parallel to faces 12 and 14, midway between and parallel to edges 16 and 18, and perpendicular to ends 20 and 22, when element 10 is static.

During one half of the cycle of vibration of element 10 in Mode A, the distortion and electrical polarization of element 10 will be as indicated by the arrows and charge polarity signs in the uppermost view in Fig. 1, the entire upper face 12 moving parallel to axis 40 in one direction corresponding to a positive electrical polarization of upper face 12, and the entire lower face 14 moving parallel to axis 40 in the opposite direction corresponding to a negative electrical polarization of lower face 14; during the other half of the cycle of vibration the directions of movement and polarizations of faces 12 and 14 will be reversed. Similarly, the arrows and charge polarity signs in the center and lowermost views of Fig. 1 indicate, respectively, the distortion and polarization of element 10 during vibration in Mode B and the distortion and polarization thereof during vibration in Mode C, it being understood that reversal of the direction of distortion and the electrical polarization will occur during the opposite half of the cycle from that instantaneously illustrated.

During vibration in Mode B, upper-left face portion 24 of element 10 distorts in a direction opposite to upper-right face portion 26, each being correspondingly oppositely polarized electrically, and lower-left face portion 28 distorts oppositely to lower-right face portion 30 with corresponding opposite electrical polarization. Further, upper-left face portion 24 distorts oppositely to lower-left face portion 28, and upper-right face portion 26 distorts oppositely to lower-right face portion 30.

Similarly, during vibration in Mode C, upper-front face portion 32 of element 10 distorts and is polarized oppositely to upper-rear face portion 34, and lower-front face portion 36 distorts and is polarized oppositely to lower-rear face portion 38, the directions of distortion of upper-front face portion 32 being opposite to that of lower-front face portion 36 and that of upper-rear face portion 34 being opposite to that of lower-rear face portion 38.

In accordance with the principle of converse piezoelectric effects, it follows that element 10 may either be mechanically vibrated by external physical forces at a proper frequency and in conformity with any of the modes of vibration illustrated in Fig. 1 to produce an alternating electrical polarization of its faces 12 and 14 corresponding to that illustrated in the appropriate view of said figure, and of a frequency characteristic of the particular mode of vibration, or faces 12 and 14 may be polarized in conformity with the charge pattern characteristic of any of the modes of vibration illustrated in Fig. 1 by the coupling therewith in appropriate manner an external alternating electrical signal of proper frequency to produce mechanical vibration of element 10 in the corresponding mode. It is known that the frequency of mechanical vibration and the frequency of the alternating polarization of element 10 will be substantially the same, and it has been further observed that the possible number and values of such frequencies at which element 10 will vibrate or resonate is dependent upon the dimensions and characteristics of element 10, as will be hereinafter further elaborated.

In the case of an element 10 having length and breadth very large in comparison with thickness, the following equation for the resonant frequency of such element when oscillating in its fundamental thickness shear mode without periodicity of the principal shear stress along the length or breadth thereof (as in Mode A) may be derived:

$$f=\frac{m}{2t}\sqrt{\frac{A}{\rho}} \qquad (1)$$

where $f$ is the resonant frequency, $m$ is an integer constant corresponding to the "$m$ index" of the mode of vibration of element 10 in the "$m$, $n$ and $p$ notation," $t$ is the thickness of element 10, A is a constant corresponding to the shear modulus of element 10, and $\rho$ is a constant corresponding to the density of element 10.

From Equation 1, it is clear that the fundamental resonant frequency of a given type and cut of piezoelectric crystal such as element 10, that is, the frequency at which it resonates in mode A ($m$=1, $n$=1 and $p$=1), is dependent entirely upon and varies with the thickness of the element 10.

In the case of an element 10 vibrating in a shear mode wherein the principal shear stress varies periodically along the length or breadth thereof (as in Mode B or Mode C), however, Equation 1 no longer holds, the possible resonant frequencies of element 10 in such periodic modes of vibration as Mode B or Mode C being given by the following equation:

$$f=\frac{1}{2}\sqrt{\frac{1}{\rho}}\sqrt{C_{11}\frac{n^2}{l^2}+C_{66}\frac{m^2}{t^2}+C_{55}\frac{p^2}{b^2}} \qquad (2)$$

where $f$ is the resonant frequency, $\rho$ is a constant corresponding to the density of element 10, $m$, $n$ and $p$ are the corresponding integer index constants of the mode of vibration of element 10, $l$, $b$ and $t$ are respectively the length, breadth and thickness of element 10, and $C_{11}$, $C_{66}$ and $C_{55}$ are the standard elastic constants of element 10.

From a comparison of Equations 1 and 2, and from substitution in the former of the "$m$ index" of Mode A and in the latter of the "$m$, $n$ and $p$ indexes" of Mode B and Mode C, respectively, it will be perceived, first, that the resonant frequency of element 10 in each of said modes of vibration will be different, and, secondly, that the value of resonant frequency for element 10 when vibrating in Mode B is somewhat higher than when vibrating in Mode A and is still higher than vibrating in Mode C.

Figure 2:
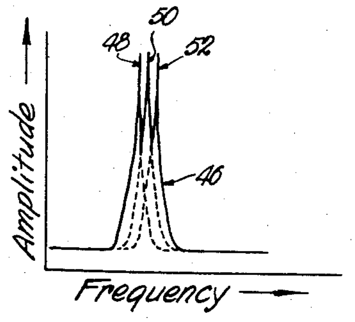
Fig. 2 is a composite graph illustrating, in solid lines, the variation with frequency of the amplitude of vibration of an element such as shown in Fig. 1, each of the peaks of the curve corresponding to one of the modes of vibration illustrated in Fig. 1, and, in dotted lines, the projections of the curve for each of the different modes of vibration considered individually.

Fig. 2 is a somewhat idealized graph illustrating by the solid-line curve 46 the approximate variation with frequency of the amplitude of vibration of an element 10 to be expected from Equations 1 and 2, assuming appropriately coupled electrical excitation, as the frequency of such excitation is continuously shifted through a frequency band including the resonant frequencies of element 10 for vibration in each of Mode A, Mode B and Mode C, the peak 48 indicating the resonant frequency for Mode A, the peak 50 indicating the resonant frequency for Mode B, and the peak 52 indicating the resonant frequency for Mode C. The dotted-line extensions of the portions of the curve 56 corresponding to each of the peaks 48, 50 and 52 illustrate, in obvious manner permitting omission of numerals for the sake of clarity, the overlapping or intercoupling between the various modes of vibration which may be expected to be exhibited in practice as a result of the finite Q or measurable resonance-width characteristics of element 10, particularly when it is mounted for support and associated with electrode and coupling structure. Experimental results were observed and found to confirm the showing of Fig. 2 predicated upon Equations 1 and 2.

As above noted, Fig. 2 assumes appropriate coupling of the external, electrical, excitation signal for element 10 therewith. Consideration of Figs. 1 and 3 will illustrate why such coupling can not be attained in practice with the conventional type of electrode structure shown in Fig. 3. Such structure includes an electrode 54 of conductive material, herein for convenience referred to as the upper electrode 54, and an electrode 56 of conductive material, herein referred to as the lower electrode 56.

Figure 3:
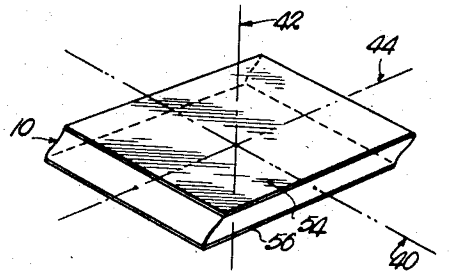
Fig. 3 is a perspective view of a piezoelectric crystal element provided with electrode structure adapted for exciting the element to vibration in the mode designated "Mode A" in Fig. 1, the configuration of the element being exaggerated to illustrate the condition thereof at one instant during its vibration in said mode.

As is clear in Fig. 3, upper electrode 54 is coupled with the entire surface of upper face 12, and lower electrode 56 is coupled with the entire surface of lower face 14. The significance of such coupling is that, at any instant, the entire upper face 12 is excited in the same polarity and at the same potential relative to lower face 14, lower face 14 being likewise excited in its entirety at a uniform potential throughout of opposite polarity to the excitation on upper face 12. Obviously, from Fig. 1, such condition is ideal for exciting element 10 to vibration in Mode A, but, dissymmetries, intercouplings and the like neglected, is absolutely incapable of exciting element 10 to vibration in Mode B or in Mode C, since each of the latter modes requires simultaneous excitation of opposite polarity on different portions of the same face 12 or 14. It may be observed that the same result is found to obtain with any electrode structure utilizing a single electrode for each of faces 12 and 14 respectively, wherein said electrodes are coupled to faces 12 and 14 symmetrically with respect to axes 40 and 44, that is, equally with respect to portions 24, 26, 32 and 34 of upper face 12 and equally with respect to portions 28, 30, 36 and 38 of lower face 14, even though such coupling does not involve the entire surfaces of faces 12 and 14.

It has been recognized, however, that the polarization patterns of an element 10 vibrating in Mode B or Mode C are of a nature permitting, theoretically at least, the provision of special electrode structure capable of exciting element 10 to vibration, not only in one of Modes B or C, but simultaneously in Mode A, assuming the coupling with element 10 through such structure of excitation signals of frequency or frequencies appropriate for exciting vibration in both of such modes.

Figure 4:
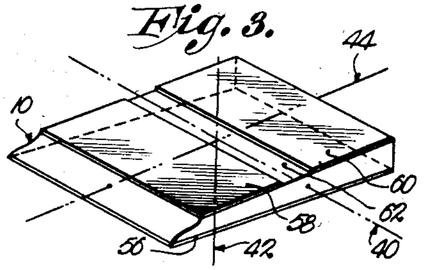
Fig. 4 is a perspective view of a piezoelectric element provided with electrode structure adapted for exciting the element to vibration simultaneously in the modes designated "Mode A" and "Mode B" in Fig. 1, the configuration of the element again being exaggerated to illustrate the condition thereof at one instant during its simultaneous vibration in said modes.

Fig. 4 illustrates element 10 distorted (in exaggeration) as it would be at one instant during simultaneous vibration in Modes A and B, and the preferred form of electrode structure found best adapted for producing such compound vibrations in element 10. Such electrode structure includes a lower electrode 56 in every manner the same as illustrated in Fig. 3 and described above in connection therewith, the significant feature of lower electrode 56 being that it is coupled, preferably equally and symmetrically, with respect to each of portions 28, 30, 36 and 38 of lower face 14, and further includes an upper-left electrode 58 and, for use of the device of this invention in most circuit-coupling applications, an upper-right electrode 60. Upper-left electrode 58 is coupled with a major part of upper left portion 24 of face 12, and upper-right electrode 60 is coupled with a major part of upper-right portion 26 of face 12, a narrow, front-to-rear strip 62 of upper face 12 including a minor part of each of portions 24 and 26 thereof being left bare between electrodes 58 and 60, as shown in Fig. 4, to insulate electrodes 58 and 60 from each other and to minimize stray capacitive coupling therebetween.

Considering lower electrode 56 and upper-left electrode 58 as constituting the excitation electrode structure for element 10, it is clear from Figs. 1 and 4 that, assuming the presence of excitation signals of appropriate frequency coupled across electrodes 56 and 58, the conditions for excitation of element 10 to vibration in either Mode A or Mode B or in both modes simultaneously have been fully satisfied. Experiment has confirmed such conclusion.

It will, therefore, be apparent that, if an alternating electrical signal of frequency corresponding to the Mode A resonant frequency of element 10 is imposed between electrodes 56 and 58, element 10 will vibrate in Mode A; if a signal of frequency corresponding to the Mode B resonant frequency of element 10 is imposed between electrodes 56 and 58, element 10 will vibrate in Mode B; if a signal of frequency between the Mode A and Mode B resonate frequencies of element 10 but within the zone of intercoupling therebetween (as defined by the area of overlapping in their respective frequency response curves) is imposed between electrodes 56 and 58, element 10 will vibrate simultaneously in both Mode A and Mode B, the relative amplitudes of the individual mode components in the resultant compound vibration being a function of the relative displacement of the frequency of the imposed signal from the respective resonant frequencies of element 10 for the two modes in question; and, finally, if a signal containing a plurality of frequencies either including frequencies corresponding to the Mode A and Mode B resonant frequencies of element 10 or within said zone of intercoupling are imposed between electrodes 56 and 58, element 10 again will obviously vibrate simultaneously in Modes A and B with the relative amplitudes of the modal components being governed by the same considerations as just set forth for the previous case.

Figure 5:
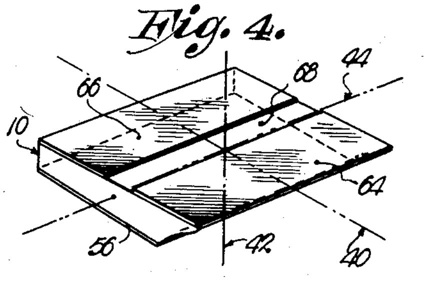
Fig. 5 is a perspective view of a piezoelectric crystal element provided with electrode structure adapted for exciting the element to vibration simultaneously in the modes designated "Mode A" and "Mode C" in Fig. 1, the configuration of the element again being exaggerated to illustrate the condition thereof at one instant during its simultaneous vibration in said modes.

Similarly, Fig. 5 illustrates element 10 distorted (in exaggeration) as it would be at one instant during simultaneous vibration in Modes A and C, as well as the preferred form of electrode structure for use in producing such simultaneous vibrations. Such electrode structure includes a lower electrode 56 of the same properties and functions as that hereinabove described in connection with Figs. 3 and 4, an upper-front electrode 64, and, if desired as for use of the device in a coupling application, an upper-rear electrode 66. Electrodes 64 and 66 are respectively similar to electrodes 58 and 60 in function but are disposed with respect to upper face 12 in a position rotated 90° from the position of electrodes 58 and 60, upper-front electrode 64 being coupled with a major part of upper-front portion 32 of face 12, upper-rear electrode 66 being coupled with a major part of upper-rear portion 34 of face 12, and there being a narrow, left-to-right strip 68 of upper face 12 including a minor part of each of portions 32 and 34 thereof left bare between electrodes 64 and 66 to insulate electrodes 64 and 66 from each other and to minimize stray capacitive coupling therebetween.

Obviously, lower electrode 56 and upper-front electrode 64 present electrode structure adapted for the excitation of element 10 to vibration in either Mode A or Mode C or in both Modes A and C simultaneously, in comparable manner to that by which electrodes 56 and 58 adapted element 10 for vibration in Modes A and B. Similarly, element 10 will be excited to vibration in Mode A, Mode C or both Modes A and C by the imposition of signals of various frequencies between electrodes 56 and 64 in accordance with principles directly corresponding to those hereinabove explained for electrodes 56 and 58 and Modes A and B.

Insofar as the adaption of element 10 for bimodal vibrations is concerned, the electrode 60 (or electrode 66, as the case may be) could be omitted, if desired; however, since such construction would obviously appear still adapted for use in certain applications, it is manifestly intended that a device so constructed be considered within the fair purview of this invention.

As will be apparent to those skilled in the art, electrode 60 (or electrode 66, as the case may be) provides an output means for electrical signals piezoelectrically produced by vibrations of element 10, in that such signals may be lead off to an external circuit by connection thereof to lower electrode 56 and upper-right electrode 60 (or lower electrode 56 and upper rear electrode 66), it being clear from Figs. 1, 4, and 5, and confirmed by experiment, that an alternating difference in electrical potential will exist between electrodes 56 and 60 (or electrodes 56 and 66) during mechanical vibration of element 10 in any of the above-mentioned modes, and further that such potential difference will correspond in frequency and amplitude with said mechanical vibrations.

Thus, in the embodiment shown in Fig. 4, upper-left electrode 58 and lower electrode 56 serve as the input or excitation receiving terminals of the device, and upper-right electrode 60 and lower electrode 56 serve as the output or signal delivering terminals; while in the embodiment shown in Fig. 5, upper-front electrode 64 and lower electrode 56 serve as the input terminals, and upper-rear electrode 66 and lower electrode 56 serve as the output terminals.

Figure 6:
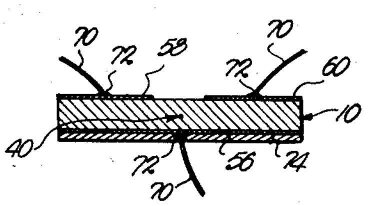
Fig. 6 is a cross-sectional view of a piezoelectric crystal element made in accordance with this invention and disposed in non-vibrating condition.

In Fig. 6 is illustrated a sectional view of a device made in accordance with this invention and embodying electrode structure as shown and described in connection with Fig. 4, said section being taken on the plane defined by axes 42 and 44. Manifestly, the appearance of a similar section of a device embodying electrode structure as shown in Fig. 5 and taken on the plane defined by axes 40 and 42 would be substantially the same. Each of electrodes 56, 58 and 60 (or electrodes 56, 64 and 66, as the case may be) are preferably extremely thin, conductive, metallic coatings of gold, silver, copper or the like plated, evaporated or otherwise suitably adhered to faces 12 and 14 in any conventional manner. A fine, flexible, lead wire 70 is physically and electrically connected with each of the electrodes 56, 58 and 60 (or 56, 64 and 66) respectively in conventional manner, as by a small blob 72 of solder or cement, providing a means for coupling element 10 with external circuits. It will be understood that element is also provided with suitable supporting means (not shown) which may be of conventional nature.

Adhered to the entire lower surface of lower electrode 56 is a comparatively thin, vibration damping layer 74 which may be of any suitable material capable of being applied in a manner yielding a layer 74, preferably of substantially uniform thickness, whose thickness may be controlled during application. Various metals and cements have been found satisfactory for this purpose. The preferred material for layer 74, however, has been found to be copper, which may be applied to electrode 56 by spraying the same thereon in molten form in the manner well known in the art. By so applying layer 74, the thickness thereof may be controlled during application by successive spraying to increase the thickness of layer 74 until the desired degree of damping of element 10 is attained, as revealed by electrical measurements of the resonance band shape characteristics of element 10 which may be made in conventional manner during application of layer 74.

Figure 7:
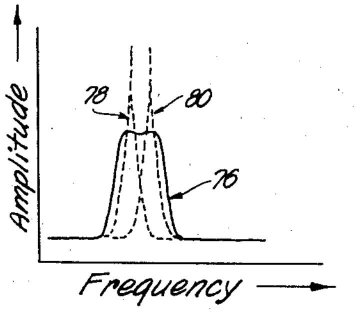
Fig. 7 is a composite graph illustrating, in solid lines, the variation with frequency of the amplitude of vibration of an element provided with electrode structure such as illustrated in Fig. 5, and, in dotted lines, the projected curves for "Mode A" and "Mode C" as shown individually in Fig. 2.

The importance of artificially damping element 10 beyond the point normally effected by conventional electrode and mounting structures by some means such as layer 74 will be apparent from an inspection of Fig. 7. In that Figure, is illustrated, in solid lines, the desired resonance band shape characteristics curve 76 of an element 10 provided with electrode structure as shown in Fig. 5 adapting element 10 for simultaneous vibration in Modes A and C and with a damping layer 74, and, in dotted lines, the individual resonance band shape curves 78 and 80 for Mode A and Mode C, respectively when element 10 is not sufficiently damped as before layer 74 has been applied. It is manifest from curves 78 and 80 that without the additional damping supplied by layer 74 the sensitivity or response of element 10 in terms of amplitude of vibrations would vary appreciably with excitation signals of different frequencies within the band bounded by the dominant frequencies of Modes A and C indicated in Fig. 2, respectively, by peaks 48 and 52.

After application of a layer 74 of proper thickness, however, it is found that the Q of element 10 may be conveniently lowered to a point broadening the individual resonance curves 78 and 80 so that the substantially flat, broad, steep-skirted resonance band characteristics illustrated by curve 76 obtain for element 10. Manifestly, the same result is attained for Modes A and B upon suitably damping an element 10 provided with electrode structure as illustrated in Fig. 4 by a layer 74, except that slightly less damping will be required and that the resultant resonance or pass band of element 10 will be narrower than for Modes A and C. The symmetry of curve 76 may be controlled by making the layer 74 of non-uniform thickness, whereby, if necessary in order to obtain substantial flatness for the curve 76, one of the resonance responses represented by the curves 78 and 80 may be damped slightly more than the other, or, if a non-symmetrical curve 76 is desired, one response may be damped appreciably more than the other to obtain the desired characteristics.

It is notable that the Q of element 10 need not be lowered to a degree sacrificing the inherent steep-skirted selectivity characteristics of element 10, but rather that substantial flatness of curve 76 may be attained without appreciably affecting the skirt selectivity thereof. Accordingly, a piezoelectric device of unique resonance band characteristics has been provided, which is capable of advantageous use in a number of applications that will be obvious to those skilled in the art, as well as one capable of rendering possible new circuits and applications which heretofore have been deemed unfeasible because of the lack of a suitable component having the operating characteristics of said device.

It has been further discovered that, by virtue of the bimodal vibratory capabilities of the device provided by this invention, practical advantage may be taken of the fact that, as shown by Equation 2, the resonant frequencies of element 10 associated with vibration thereof in Mode B or Mode C are functions of the length and breadth of element 10 as well as the thickness thereof. Since the fundamental or Mode A resonant frequency of element 10 is determined solely by its thickness in accordance with Equation 1, and since the "*m, n* and *p* index" numerators of the length and breadth factors in Equation 2 are respectively 2 and 1 in the case of Mode B but 1 and 2 in the case of Mode C, it is apparent that the width of the resonance or pass band of element 10 can be controlled, without changing the fundamental or Mode A resonant frequency thereof, by preselection of the ratio between the length and the breadth of element 10, the width of the pass band increasing as the length-to-breadth ratio of element 10 decreases, and that such fact still holds for both of the types of electrode disposition shown in Figs. 4 and 5.

The practical range of predeterminable and controllable variation of the width of the resonance or pass band of an AT cut, quartz element 10, utilizing both the available choice between vibration in Modes A and B or in Modes A and C and the available choice of length to breadth ratios (it being understood that the "breadth" as such term is herein used is always parallel to the electrical axis 40 of element 10), has been found to be from about 4 kilocycles to about 20 kilocycles. The effect of such choices may be predicated to a close approximation by Equations 1 and 2.

For an actual example, a quartz, AT cut element 10 having a thickness adapting the same for oscillation in Mode A at approximately 1500 kilocycles, a length (parallel to axis 44 and perpendicular to electrical axis 40) of one inch, a breadth (parallel to electrical axis 40) of four-tenths of an inch, and electrode structure as shown in Fig. 4 gave a substantially flat, steep-skirted resonance or pass band for element 10 of about seven and one-half kilocycles in width at the peak, with a skirt to peak ratio of about two to one at twenty decibels down.

That the applicability of the principles of this invention is not necessarily limited to elements 10 of quartz, or to quartz elements 10 of "AT cut," or to the particular modes of vibration illustrated, is amply shown by the considerations discussed hereinabove. Their applicability would appear limited, however, insofar as flat response, wide band devices are concerned, to elements 10 capable of vibration in different modes at separate frequencies which differ from each other by only such amounts as may be compensated for by such degree of damping from layer 74 or other manner of control over the mechanical response of element 10 as will produce a continuous resonance or pass band therebetween without serious impairment of the overall sensitivity of element 10. This invention also expressly contemplates, however, the possibility of omitting the damping layer 74 altogether to produce a device capable of simultaneous resonant operation only at each of a pair of separated frequencies, rather than throughout the frequency band therebetween with substantially flat response characteristics; in such embodiment, the above mentioned limitation will obviously not be applicable.

It is significant that a piezoelectric device made in accordance with this invention closely approximates in its operating characteristics those of an inductive-capacitive resonant circuit of the same Q, the principal advantages of said device over an L-C circuit stemming from the fact that it possesses a much higher Q than could ever be approached in practice with an L-C circuit, thereby making possible the greater skirt selectivity characteristic of the device and, with the damping effected by layer 74, the improved, flatter peak also characteristic of the device and unattainable with an L-C circuit of comparable skirt selectivity. It is also notable that less damping is required as the operating frequency of the device is increased, so that the Q of the device hereof increases, rather than decreases as is usual with L-C circuits, as the operating frequency for which it is resonant increases with consequent advantages obvious to those skilled in the art.

Figure 8:
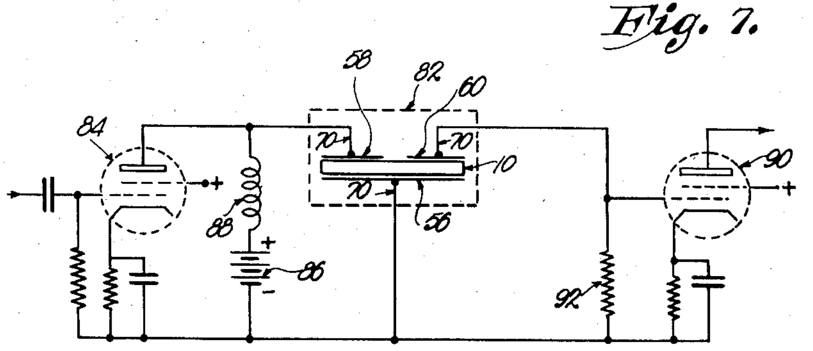
Fig. 8 is a schematic representation of one application of the piezoelectric device of this invention as a circuit coupling apparatus.

Referring now to Fig. 8, there is illustrated the preferred manner of utilizing the device of this invention as a resonant, broad band, coupling component between two electrical circuits, the device being generally designated by the numeral 82 in this figure and being understood to be in any of the forms hereinabove described which include an output electrode 60 or 66 the numbering in the figure corresponding to the electrode structure as shown in Fig. 4 being merely illustrative.

The particular coupling application shown for purposes of illustration is in the intermediate frequency amplifier of a radio receiver having a first amplifier tube 84 provided with a plate circuit having a source of plate potential 86 coupled with tube 84 through a radio frequency blocking choke 88 in conventional manner, and a following amplifier tube 90 provided with a control grid circuit having a resistor 92 therein to maintain the input to tube 90 above ground potential in conventional manner. The device 82 is coupled between tubes 84 and 90 in the manner shown, in the place of the "I.F. transformer" comprising two intercoupled, tuned L-C circuits conventionally employed, the input electrodes 58 and 56 (or 64 and 56) of device 82 being connected respectively, with the plate circuit and the cathode return circuit of tube 84, and the output electrodes 60 and 56 (or 66 and 56) of device 82 being connected respectively with the control grid circuit and the cathode return circuit of tube 90.

In such an application, device 82 exhibits the improved pass band characteristics above described with an insertion loss of only about two to three decibels at about four megacycles or higher. At frequencies below about four megacycles, some increase in insertion loss is experienced with the circuit shown in Fig. 8, apparently due to the effects of the relatively lower Q of elements 10 for lower frequencies.

Figure 9:
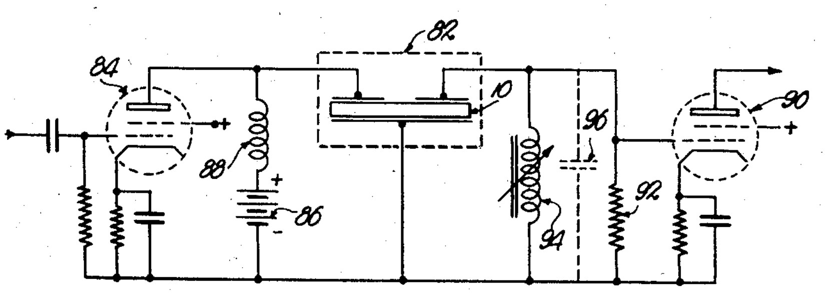
Fig. 9 is a schematic representative showing a modified form of the circuit illustrated in Fig. 8.

The circuit of Fig. 9 illustrates the way in which such increase in insertion loss at lower frequencies may be eliminated by the addition in the control grid circuit of tube 90 of an inductance 94 preferably slug-tunable, of value adapted to resonate with the aggregate stray capacitance (represented as at 96) of the circuit at the frequency of operation of device 82, other parts of the circuit of Fig. 9 being the same as in Fig. 8.

The construction, characteristics and capabilities of the type of piezoelectric unit contemplated by this invention should now be clear. It should likewise be apparent that various minor changes or modifications might well be made from the exact structure described hereinabove and that the device contemplated hereby is adaptable for use in many applications other than those expressly referred to without departing from the spirit of this invention. Those skilled in the art will immediately recognize that among the applications for this invention, besides the receiver intermediate frequency, interstage coupling application herein described, would be included countless other coupling and filtering applications including use as a receiver input filter, as a filter for single sideband systems, as a filter for frequency shift keying systems, as well as many applications of a decoupling or band rejection rather than a band passing nature. Accordingly, it is intended that this invention shall be considered as limited only by the scope of the appended claims.

Having thus described the invention, what is claimed as new and desired to be secured by Letters Patent is:

1. In apparatus having desired, predetermined, frequency selective, plural resonance, high frequency, electrical response characteristics for use in electrical equipment, the combination of: a piezoelectric, AT cut, quartz, crystal element having an external surface including a pair of opposed, substantially planar, parallel, major faces and internal, molecular structure so arranged and oriented relative to said faces that the element has a pair of significant, high frequency thickness shear mode resonances and is adapted to respond piezoelectrically at either of a corresponding pair of different, predetermined, resonance frequencies upon application of alternating current, electrical signals of the respectively corresponding of said frequencies between a pair of different, predetermined partial portions of said surface included within said faces, said response of the element at one of said resonance frequencies being characterized by oscillation of the element in one, predetermined, high frequency thickness shear mode of mechanical vibration at said one resonance frequency, said response of the element at the other of said resonance frequencies being characterized by oscillation of the element in a different, predetermined, high frequency thickness shear mode of mechanical vibration at said other resonance frequency, said responses of the element at said respective resonance frequencies being further characterized and differentiated from each other by having different, predetermined, characteristic patterns of normal, relative polarization of piezoelectric charges upon said faces, said patterns having the same relative polarization of charges between said pair of surface portions for both of said resonance responses of the element; and input circuit means for the element substantialy as described for electrically exciting said element into desired and controlled, simultaneous oscillation thereof in both of said modes and a dynamic condition of desired and controlled, simultaneous response to signals of both of said resonance frequencies, said input circuit means including a first, electrically conductive, electrode structure electrically coupled in substantially its entirety with one of said surface portions, a second, electrically conductive, electrode structure electrically coupled with the other of said surface portions, and electrically conductive, coupling structure electrically coupled with said first and second electrode structures and adapted for electrically coupling the latter with a first, external, electrical circuit carrying excitation signals for the element of both of said resonance frequencies.

2. In apparatus as set forth in claim 1, wherein there is further provided, in combination with said element and said input circuit means, damping means for the element substantially as described and operably coupled therewith for simultaneously broadening the frequency widths of both of said resonance responses of the element sufficiently to overlap the same and adapt the element to respond piezoelectrically and simultaneously both at said resonance frequencies and at any frequencies within a continuous band of frequencies including and substantially bounded by said resonance frequencies, said damping means including a layer of damping material adhered to one of said major faces of the element throughout substantially the entirety of said one face, said layer being of substantially uniform thickness and mass per unit of area thereof throughout the layer, said first external circuit carrying excitation signals for the element of a plurality of frequencies within said frequency band.

3. In inter-circuit coupling and filtering apparatus having desired, predetermined, frequency selective, plural resonance, high frequency, electrical response characteristics for use in electrical equipment, the combination of: a piezoelectric, AT cut, quartz, crystal element having an external surface including a pair of opposed, substantially planar, parallel, major faces and internal, molecular structure so arranged and oriented relative to said faces that the element has a pair of significant, high frequency thickness shear mode resonances and is adapted to respond piezoelectrically at either of a corresponding pair of different, predetermined, resonance frequencies upon application of alternating current, electrical signals of the respectively corresponding of said frequencies between a first pair of different, predetermined, partial portions of said surface included within said faces, said response of the element at one of said resonance frequencies being characterized by oscillation of the element in one, predetermined, high frequency thickness shear mode of mechanical vibration at said one resonance frequency, said response of the element at the other of said resonance frequencies being characterized by oscillation of the element in a different, predetermined, high frequency thickness shear mode of mechanical vibration at said other resonance frequency, said responses of the element at said respective resonance frequencies being further characterized and differentiated from each other by having different, predetermined, characteristic patterns of normal, relative polarization of piezoelectric charges upon said faces, said patterns having the same relative polarization of charges between said first pair of surface portions for both of said resonance responses of the element; input circuit means for the element substantially as described for electrically exciting said element into desired and controlled, simultaneous oscillation thereof in both of said modes and a dynamic condition of desired and controlled, simultaneous response to signals of both of said resonance frequencies, said input circuit means including a first, electrically conductive, electrode structure electrically coupled in substantially its entirety with one of said first pair of surface portions, a second, electrically conductive, electrode structure electrically coupled with the other of said first pair of surface portions, and electrically conductive, coupling structure electrically coupled with said first and second electrode structures and adapted for electrically coupling the latter with a first, external, electrical circuit carrying excitation signals for the element of both of said resonance frequencies; and output circuit means for the element substantially as described for deriving and delivering from the element a desired and controlled, electrical output of signals corresponding to said excitation signals and simultaneously including signals of both of said resonance frequencies, said output circuit means including a third, electrically conductive, electrode structure electrically coupled in substantially its entirety with one of a second pair of different, predetermined, partial surface portions included within said faces, said second electrode structure being electrically coupled with the other of said second pair of surface portions, and electrically conductive, coupling structure electrically coupled with said second and third electrode structures and adapted for electrically coupling the latter with a second, external, electrical circuit adapted for utilizing said output including signal components thereof of both of said resonance frequencies.

4. In apparatus as set forth in claim 1, wherein there is further provided, in combination with said element, said input circuit means and said output circuit means, damping means for the element substantially as described and operably coupled therewith for simultaneously broadening the frequency widths of both of said resonance responses of the element sufficiently to overlap the same and adapt the element to respond piezoelectrically and simultaneously both at said resonance frequencies and at any frequencies within a continuous band of frequencies including and substantially bounded by said resonance frequencies, said damping means including a layer of damping material adhered to one of said major faces of the element throughout substantially the entirety of said one face, said layer being of substantially uniform thickness and mass per unit of area thereof throughout the layer, said first external circuit carrying excitation signals for the element of a plurality of frequencies within said frequency band.

5. In apparatus having desired, predetermined, frequency selective, plural resonance, high frequency, electrical response characteristics for use in electrical equipment, the combination of: a generally parallelepipedal, piezoelectric, AT cut, quartz, crystal element having an external surface including a pair of opposed, substantially planar, parallel, substantially rectangular, major faces and internal, molecular structure so arranged and oriented relative to said faces that the element has a pair of significant, high frequency thickness shear mode resonances of the same order and is adapted to respond piezoelectrically at either of a corresponding pair of different, predetermined, relatively adjacent, resonance frequencies upon application of alternating current, electrical signals of the respectively corresponding of said frequencies between one half of one of said faces and the corresponding one half of the other of said faces, said response of the element at one of said resonance frequencies being characterized by oscillation of the element in one, predetermined, high frequency thickness shear mode of mechanical vibration having a given periodicity along the thickness dimension of the element perpendicular to said faces and a periodicity of unity along each of the length and width dimensions of said faces, said response of the element at the other of said resonance frequencies being characterized by oscillation of the element in a different, predetermined, high frequency thickness shear mode of mechanical vibration having the same given periodicity as said one mode along the thickness dimension of the element perpendicular to said faces and a periodicity of unity along one and a periodicity of greater than unity along the other of the length and width dimensions of said faces, said responses of the element at said respective resonance frequencies being further characterized and differentiated from each other by having different, predetermined, characteristic patterns of normal, relative polarization of piezoelectric charges upon said faces, said patterns having the same relative polarization of charges between said one halves of the faces for both of said resonance responses of the element; and input circuit means for the element substantially as described for electrically exciting said element into desired and controlled, simultaneous oscillation thereof in both of said modes and a dynamic condition of desired and controlled, simultaneous response to signals of both of said resonance frequencies, said input circuit means including a first, electrically conductive, electrode structure electrically coupled in substantially its entirety with at least a major portion of said one half of said one face, a second electrically conductive, electrode structure electrically coupled with at least a major portion of said one half of said other face, and electrically conductive, coupling structure electrically coupled with said first and second electrode structures and adapted for electrically coupling the latter with a first, external, electrical circuit carrying excitation signals for the element of both of said resonance frequencies.

6. In apparatus as set forth in claim 5, wherein there is further provided, in combination with said element and said input circuit means, damping means for the element substantially as described and operably coupled therewith for simultaneously broadending the frequency widths of both of said resonance responses of the element sufficiently to overlap the same and adapt the element to respond piezoelectrically and simultaneously both at said resonance frequencies and at any frequencies within a continuous band of frequencies including and substantially bounded by said resonance frequencies, said damping means including a layer of damping material adhered to one of said major faces of the element throughout substantially the entirety of said one face, said layer being of substantially uniform thickness and mass per unit of area thereof throughout the layer, said first external circuit carrying excitation signals for the element of a plurality of frequencies within said frequency band.

7. In inter-circuit coupling and filtering apparatus having desired, predetermined, frequency selective, plural resonance, high frequency, electrical response characteristics for use in electrical equipment, the combination of: a generally parallelepipedal, piezoelectric, AT cut, quartz, crystal element having an external surface including a pair of opposed, substantially planar, parallel, substantially rectangular, major faces and internal, molecular structure so arranged and oriented relative to said faces that the element has a pair of significant, high frequency thickness shear mode resonances of the same order and is adapted to respond piezoelectrically at either of a corresponding pair of different, predetermined, relatively adjacent, resonance frequencies upon application of alternating current, electrical signals of the respectively corresponding of said frequencies between one half of one of said faces and the corresponding one half of the other of said faces, said response of the element at one of said resonance frequencies being characterized by oscillation of the element in one, predetermined, high frequency thickness shear mode of mechanical vibration having a given periodicity along the thickness dimension of the element perpendicular to said faces and a periodicity of unity along each of the length and width dimensions of said faces, said response of the element at the other of said resonance frequencies being characterized by oscillation of the element in a different, predetermined high frequency thickness shear mode of mechanical vibration having the same given periodicity as said one mode along the thickness dimension of the element perpendicular to said faces and a periodicity of unity along one and a periodicity of greater than unity along the other of the length and width dimensions of said faces, said responses of the element at said respective resonance frequencies being further characterized and differentiated from each other by having different, predetermined, characteristic patterns of normal, relative polarization of piezoelectric charges upon said faces, said patterns having the same relative polarization of charges between said one halves of the faces for both of said resonance responses of the element; input circuit means for the element substantially as described for electrically exciting said element into desired and controlled, simultaneous oscillation thereof in both of said modes and a dynamic condition of desired and controlled, simultaneous response to signals of both of said resonance frequencies, said input circuit means including a first, electrically conductive, electrode structure electrically coupled in substantially its entirety with at least a major portion of said one half of said one face, a second, electrically conductive, electrode structure electrically coupled with at least a major portion of said one half of said other face, and electrically conductive, coupling structure electrically coupled with said first and second electrode structures and adapted for electrically coupling the latter with a first, external, electrical circuit carrying excitation signals for the element of both of said resonance frequencies; and output circuit means for the element substantially as described for deriving and delivering from the element a desired and controlled, electrical output of signals corresponding to said excitation signals and simultaneously including signals of both of said resonance frequencies, said output circuit means including a third, electrically conductive, electrode structure electrically coupled in substantially its entirety with the other half of said one face, said second electrode structure being electrically coupled with both said one and the other halves of said other face, and electrically conductive, coupling structure electrically coupled with said second and third electrode structures and adapted for electrically coupling the latter with a second, external, electrical circuit adapted for utilizing said output including signal components thereof of both of said resonance frequencies.

8. In apparatus as set forth in claim 7, wherein there is further provided, in combination with said element and said input circuit means, damping means for the element substantially as described and operably coupled therewith for simultaneously broadening the frequency widths of both of said resonance responses of the element sufficiently to overlap the same and adapt the element to respond piezoelectrically and simultaneously both at said resonance frequencies and at any frequencies within a continuous band of frequencies including and substantially bounded by said resonance frequencies, said damping means including a layer of damping material adhered to one of said major faces of the element throughout substantially the entirety of said one face, said layer being of substantially uniform thickness and mass per unit of area thereof throughout the layer, said first external circuit carrying excitation signals for the element of a plurality of frequencies within said frequency band.

9. In apparatus as set forth in claim 7, wherein said mechanical vibration of the element at both of said resonance frequencies has a periodicity of unity along the thickness dimension of the element perpendicular to said faces, and said mechanical vibration of the element at said other resonance frequency has a periodicity of two along said other of the length and width dimensions of said faces.

References Cited in the file of this patent

UNITED STATES PATENTS

| | | |
|---|---|---|
| 2,159,891 | Guerbilsky | May 23, 1939 |
| 2,240,293 | Goddard | Apr. 29, 1941 |
| 2,271,870 | Mason | Feb. 3, 1942 |
| 2,277,709 | McSkimin et al. | Mar. 31, 1942 |
| 2,292,885 | Mason | Aug. 11, 1942 |
| 2,292,886 | Mason | Aug. 11, 1942 |
| 2,306,909 | Sykes | Dec. 29, 1942 |
| 2,308,397 | Starr | Jan. 12, 1943 |
| 2,309,467 | Mason | Jan. 26, 1943 |
| 2,510,811 | Gale | June 6, 1950 |
| 2,779,191 | Willard | Jan. 29, 1957 |

FOREIGN PATENTS

| | | |
|---|---|---|
| 748,910 | France | Apr. 25, 1933 |